(12) United States Patent
Shin

(10) Patent No.: US 11,215,873 B2
(45) Date of Patent: Jan. 4, 2022

(54) BACKLIGHT UNIT COMPRISING REFLECTOR WITH FIRST GUIDE POCKET AND DISPLAY APPARATUS INCLUDING THE SAME

(71) Applicant: LG Display Co., Ltd., Seoul (KR)

(72) Inventor: Dong-Hyeok Shin, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/133,900

(22) Filed: Dec. 24, 2020

(65) Prior Publication Data

US 2021/0200031 A1    Jul. 1, 2021

(30) Foreign Application Priority Data

Dec. 31, 2019  (KR) .................. 10-2019-0179340

(51) Int. Cl.
  *G02F 1/1333*   (2006.01)
  *G02F 1/13357*  (2006.01)
  *F21V 8/00*     (2006.01)

(52) U.S. Cl.
  CPC ..... *G02F 1/133605* (2013.01); *G02B 6/0055* (2013.01)

(58) Field of Classification Search
  CPC .................. G02B 6/0055; G02F 1/133605
  See application file for complete search history.

(56) References Cited

U.S. PATENT DOCUMENTS

| 6,828,721 B2* | 12/2004 | Wakita | G02F 1/133308 |
| | | | 313/491 |
| 6,910,784 B2* | 6/2005 | Ito | G02B 6/0055 |
| | | | 349/58 |
| 2003/0223020 A1* | 12/2003 | Lee | G02B 6/0088 |
| | | | 349/58 |
| 2007/0085943 A1* | 4/2007 | Kang | G02B 6/0085 |
| | | | 349/65 |
| 2011/0205464 A1* | 8/2011 | Kim | G02B 6/005 |
| | | | 349/64 |
| 2015/0355404 A1* | 12/2015 | Lee | G02B 6/0035 |
| | | | 362/606 |
| 2017/0139125 A1* | 5/2017 | Zhang | G02B 6/0091 |

FOREIGN PATENT DOCUMENTS

KR   20-0355015 Y1   7/2004
KR   10-2009-0002995 A   1/2009

* cited by examiner

*Primary Examiner* — Keith G. Delahoussaye
(74) *Attorney, Agent, or Firm* — Birch, Stewart, Kolasch & Birch, LLP

(57) ABSTRACT

Discussed are a backlight unit and a display apparatus including the same. The display apparatus includes a light guide plate, optical sheets arranged on an upper surface of the light guide plate, a reflector configured to receive the light guide plate and the optical sheets therein, and a bottom cover configured to receive the reflector therein.

12 Claims, 8 Drawing Sheets

BACKLIGHT UNIT COMPRISING REFLECTOR WITH FIRST GUIDE POCKET AND DISPLAY APPARATUS INCLUDING THE SAME

CROSS-REFERENCE TO RELATED APPLICATIONS

This application claims the priority benefit of the Korean Patent Application No. 10-2019-0179340, filed in the Republic of Korea on Dec. 31, 2019, the entire contents of which are hereby expressly incorporated by reference as if fully set forth herein into the present application.

BACKGROUND OF THE INVENTION

Field of the Invention

The present invention relates to a backlight unit and a display apparatus including the same, and more particularly, to a backlight unit in which a light guide plate and optical sheets are seated in a bottom cover, and a display apparatus including the same.

Discussion of the Related Art

As we have entered the information age, the field of displays for visually displaying electrical information signals has rapidly developed and, in order to satisfy such development, various display apparatuses having excellent performance and properties, such as thinness, light weight and low power consumption, are being developed.

As examples of such display apparatuses, there are a liquid crystal display (LCD) apparatus, an organic light emitting diode (OLED) display apparatus, a quantum dot display apparatus, etc.

Among such display apparatuses, self-luminous display apparatuses which do not require separate light sources and which can achieve compactness and clear color display, such as an organic light emitting diode (OLED) display apparatus, are considered as a competitive application.

The OLED display apparatus includes self-light emitting diodes which are provided in respective pixels to emit light, and the light emitting diode includes two electrodes which are opposite each other, and a light emitting layer which is arranged between the two electrodes to emit light when transported electrons and holes are recombined. Organic light emitting diodes, which are self-light emitting diodes using a thin light emitting layer interposed between electrodes, are advantageous in that they can be formed into a thin film. Further, the organic light emitting diodes do not require any light source, and can thus be easily implemented as flexible, bendable and foldable display apparatuses so as to be designed in various shapes.

Further, in an LCD display apparatus, in order to couple a backlight unit and a liquid crystal module on a bottom cover, a plurality of coupling processes are performed in consideration of coupling positions or a coupling sequence of the backlight unit and the liquid crystal module or a coupling sequence. Particularly, methods for fixing optical sheets and measures to prevent or mitigate wrinkles which can be caused by thermal deformation are being applied.

However, in this LCD display apparatus, the optical sheets or a reflective sheet may be wrinkled due to thermal deformation upon high-temperature reliability evaluation. In addition, because the optical sheets and the reflective sheet are formed of a thin sheet material, assembly failure may occur during a process of assembling the optical sheets and the reflective sheet with a light guide plate within the bottom cover.

SUMMARY OF THE INVENTION

Accordingly, the present invention is directed to a backlight unit and a display apparatus including the same that substantially obviate one or more problems due to limitations and disadvantages of the related art.

An object of the present invention is to provide a backlight unit in which a reflective sheet is improved to have a mold-type reflector structure having a predetermined shape so as to simultaneously receive both a light guide plate and optical sheets.

Another object of the present invention is to provide a backlight unit which can fix a light guide plate through a reflector, without a conventional structure for supporting the light guide plate, so as to provide light having uniform brightness.

Yet another object of the present invention is to provide a display apparatus in which a reflector can fix optical sheets and thereby minimize image quality deterioration, due to such as generation of wrinkles, even when the optical sheets are thermally deformed.

Additional advantages, objects, and features of the invention will be set forth in part in the description which follows and in part will become apparent to those having ordinary skill in the art upon examination of the following or can be learned from practice of the invention. The objectives and other advantages of the invention can be realized and attained by the structure particularly pointed out in the written description and claims hereof as well as the appended drawings.

To achieve these objects and other advantages and in accordance with the purpose of the invention, as embodied and broadly described herein, a backlight unit includes a light guide plate, optical sheets arranged on an upper surface of the light guide plate, a reflector configured to receive the light guide plate and the optical sheets therein, and a bottom cover configured to receive the reflector therein.

The reflector can include at least one first guide pocket protruding from one side surface thereof or two side surfaces thereof opposite each other.

The bottom cover can include at least one first pocket groove formed in one side wall thereof so that the at least one first guide pocket is inserted thereinto.

The light guide plate can include at least one first protrusion configured to protrude so as to be mounted in the at least one first guide pocket.

The optical sheets can include at least one second protrusion configured to protrude so as to be mounted in the at least one first guide pocket.

The reflector can further include at least one second guide pocket protruding from another side surface thereof opposite the one side surface thereof.

The backlight unit can further include at least one rattle pad inserted into the at least one second guide pocket so as to contact a side surface of the light guide plate corresponding to the another side surface of the reflector.

The at least one rattle pad can elastically press the light guide plate from an inside of the at least one second guide pocket.

The bottom cover can include at least one second pocket groove formed in a side wall thereof corresponding to the other side surface of the reflector so that the at least one second guide pocket inserted thereinto.

Light sources configured to emit light to the light guide plate can be arranged on another side surface of the reflector adjacent to the at least one first protrusion.

In another aspect of the present invention, a display apparatus includes a guide panel configured to support edge areas of a rear surface of a display panel; and a backlight unit including a bottom cover configured to be opposite the guide panel, optical sheets interposed between the guide panel and the bottom cover, a light guide plate arranged on a rear surface of the optical sheets, a reflector configured to receive the light guide panel therein, and light sources configured to emit light to the light guide plate.

The reflector can include at least one first guide pocket protruding from one side surface thereof or two side surfaces thereof opposite each other, and at least one second guide pocket protruding from another side surface thereof opposite the one side surface thereof.

The guide panel can include at least one pocket cover configured to cover an upper portion of the at least one first guide pocket.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Figure 1:
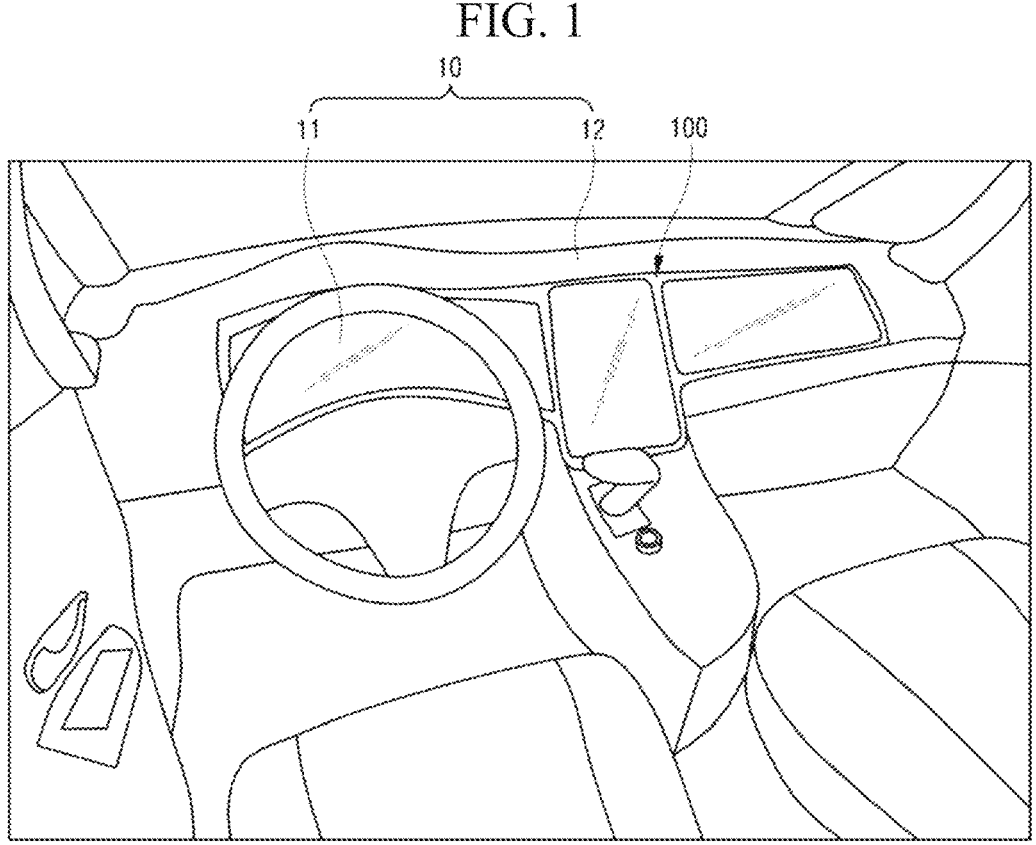
FIG. 1 is a perspective view illustrating the inside of a vehicle provided with a display apparatus according to one embodiment of the present invention.

Reference will now be made in detail to the exemplary embodiments of the present invention, examples of which are illustrated in the accompanying drawings. However, the present invention can be embodied in many alternative forms and should not be construed as being limited to the embodiments set forth herein, the embodiments of the present invention are provided only to completely disclose the invention and to completely inform those skilled in the art of the scope of the invention, and it is intended that the present invention is defined by the appended claims.

Shapes, sizes, rates, angles and numbers disclosed in the drawings to describe the embodiments of the present invention are only exemplary and do not limit the present invention. In the following description of the embodiments and the drawings, the same or similar elements are denoted by the same reference numerals even when they are depicted in different drawings. In the following description of the embodiments of the present invention, a detailed description of known functions and configurations incorporated herein will be omitted when it can make the subject matter of the present invention rather unclear. In the following description of the embodiments, the terms "including", "comprising" and "having" are to be interpreted as indicating the presence of one or more other characteristics, numbers, steps, operations, elements or parts stated in the specification or combinations thereof, and do not exclude the presence of characteristics, numbers, steps, operations, elements, parts or combinations thereof, or the possibility of adding the same, unless the term "only" is used. It will be understood that a singular expression encompasses a plural expression unless stated otherwise.

In the interpretation of elements included in the various embodiments of the present invention, it is to be interpreted that the elements include error ranges unless stated otherwise.

In the following description of the embodiments, it will be understood that, when positional relationships are expressed, for example, when an element is "on", "above", "under" or "beside" another element, the two elements can directly contact each other, or one or more other elements can be interposed between the two elements, unless the term "just" or "directly" is used.

In the following description of the embodiments, it will be understood that, when temporal relationships are expressed, for example, when terms expressing a sequence of events, such as "after", "subsequent to", "next" and "before" are used, the terms encompass both a continuous relationship between the events and a discontinuous relationship between the events, unless the term "just" or "directly" is used.

In the following description of the embodiments, it will be understood that, when the terms "first", "second", etc. are used to describe various elements, these terms are used merely to discriminate the same or similar elements. Therefore, a first element described hereinafter can be a second element without departing from the technical scope of the invention.

In the following description of the embodiments, it will be understood that the terms "first", "second", "A", "B", "(a)", "(b)", etc. can be used to describe various elements. These terms are used merely to discriminate the corresponding elements from other elements, and do not limit the nature, sequence, order or number of the corresponding elements. When an element or layer is referred to as being "engaged with", "coupled to" or "connected to" another element or layer, it can be directly engaged with, coupled to or connected to the other element or layer or be engaged with, coupled to or connected to the other element or layer by yet another element, or intervening elements or layers can be "interposed" between the respective elements.

In the present invention, "display apparatuses" can include, in a narrow sense, display apparatuses, each of which includes a display panel and a driving unit to drive the display panel, such as a liquid crystal module (LCM), an organic light emitting diode (OLED) module and a quantum-dot (QD) module. Further, "display apparatuses" can include complete products (e.g., finished products) including an LCM, an OLED module and a QD module, such as a notebook computer, a TV, a computer monitor and an automotive display, other equipment display apparatuses for vehicles, and set electronic apparatuses or set apparatuses, such as a mobile electronic apparatus, e.g., a smartphone or an electronic pad.

Therefore, in the following description of the embodiments, display apparatuses can include, in a narrow sense, display apparatuses, such as an LCM, an OLED module and a QD module, and include application products or set apparatuses which are finished consumer products, including an LCM, an OLED module and a QD module.

Further, in some cases, an LCM, an OLED module and a QD module including a display panel and a driving unit can be referred to as display apparatuses in a narrow sense, and electronic apparatuses including an LCM, an OLED module and a QD module, i.e., complete products, can be referred to as set apparatus, discriminately. For example, the display apparatus in a narrow sense can conceptually include an LCD, OLED or QD display panel and a source PCB which is a controller to drive the display panel, and the set apparatus can conceptually further include a set PCB which is a controller conductively connected to the source PCB to control the entirety of the set apparatus.

As a display panel used in the embodiments of the present invention, all types of display panels, such as a liquid crystal display panel, an organic light emitting diode (OLED) display panel, a quantum-dot (QD) display panel and an electroluminescent display panel, can be used, and the display panel used in the embodiments of the present invention is not limited to any specific type of display panel in which a bezel thereof is being capable of being bent using a flexible substrate for OLED display panels and a back plate support structure. Further, the display panel used in the display apparatus according to the embodiments of the present invention is not limited as to the shape and size thereof.

For example, when a liquid crystal display panel is used as the display panel, the display panel includes a plurality of gate lines, a plurality of data lines, and pixels formed at intersections between the gate lines and the data lines. Further, the display panel can include an array substrate including thin film transistors which are switching elements for respectively adjusting light transmittance in the pixels, an upper substrate having a color filter and/or a black matrix, and a liquid crystal layer formed between the array substrate and the upper substrate.

FIG. 1 is a perspective view illustrating the inside of a vehicle provided with a display apparatus according to one embodiment of the present invention, and FIG. is an exploded perspective view illustrating the display apparatus shown in FIG. 1. All the components of the display apparatus according to all embodiments of the present invention are operatively coupled and configured.

As the display panel shown in FIG. 1, a liquid crystal display (LCD) apparatus will be exemplarily described.

Figure 2:
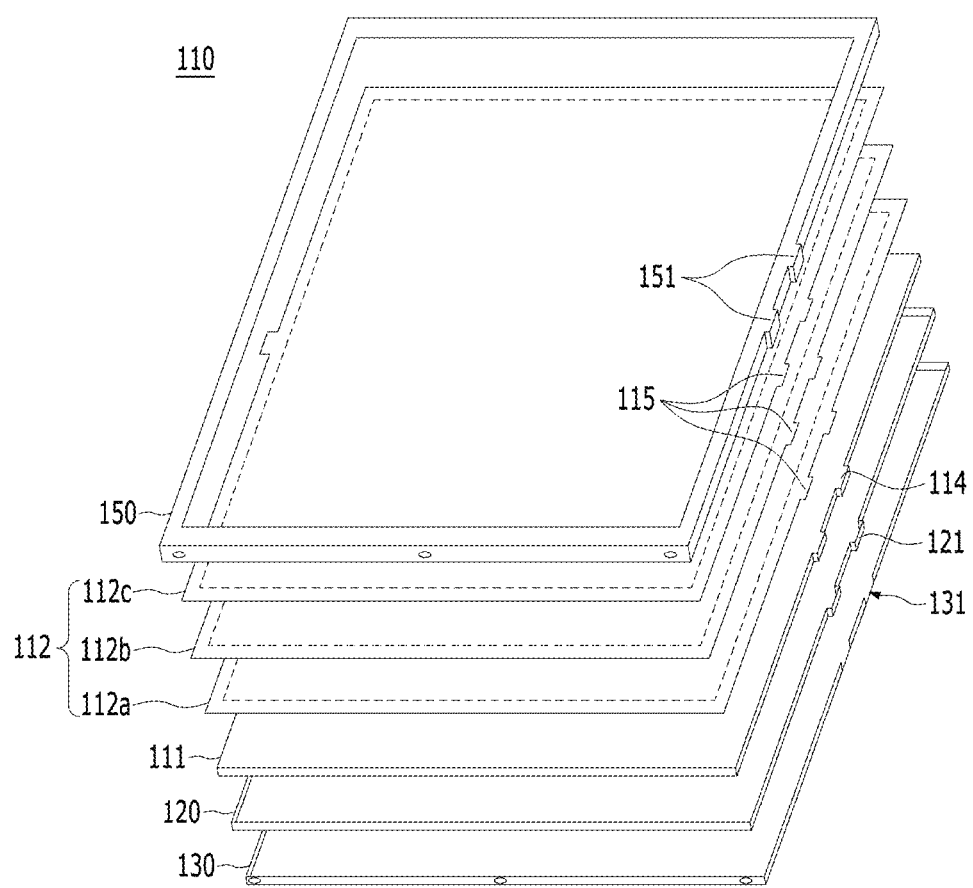
FIG. 2 is an exploded perspective view illustrating the display apparatus shown in FIG. 1.

Referring to FIGS. 1 and 2, a display apparatus 100 according to one embodiment of the present invention can have an approximately rectangular shape. However, the display apparatus 100 is not limited to the rectangular shape, and can be manufactured to have any of various shapes, such as a polygonal shape or a curved shape. The display apparatus 100 can include a display panel, a backlight unit 110 and a guide panel 150.

The display apparatus 100 can be in a state in which a display function and a touch function are integrated, a cover window can be adhered to the front surface of the display apparatus 100, and the display panel can be arranged on the rear surface of the cover window. The display apparatus 100 can be arranged at an instrument panel 11 or a center fascia 12 on a dashboard 10 of a vehicle. Here, the cover window can be a cover glass formed of glass.

Figure 6:
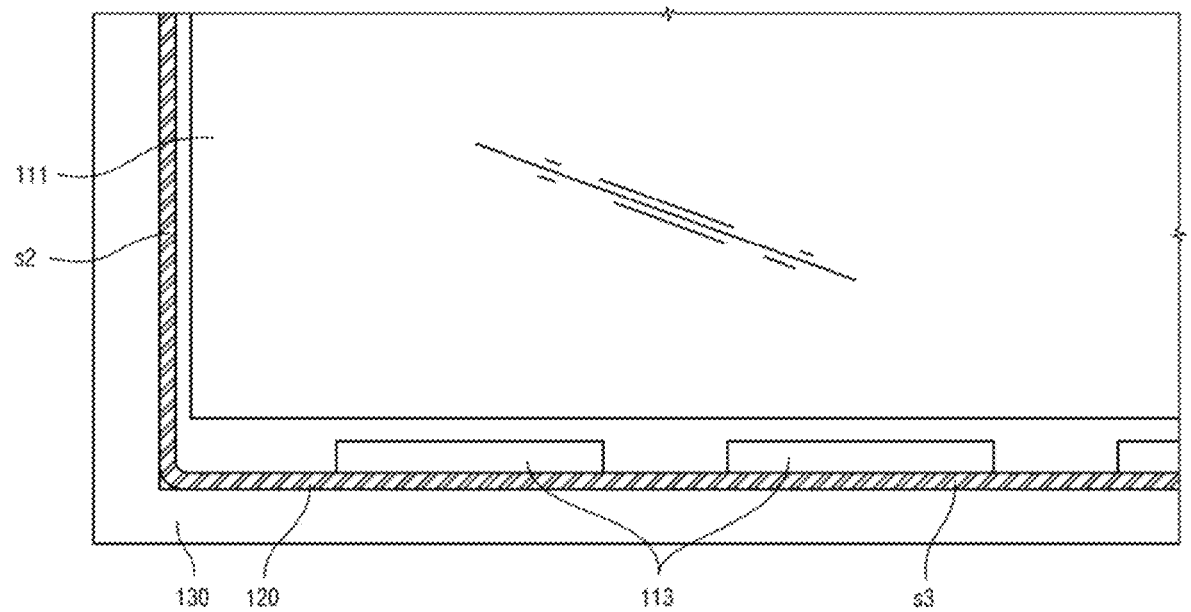
FIG. 6 is a partially enlarged view illustrating region B of the reflector shown in FIG. 3.

The backlight unit 110 can include a light guide plate 111, optical sheets 112 arranged on the upper surface of the light guide plate 111, a reflector 120 configured to receive the optical sheets 112 and the light guide plate 111, a bottom cover 130 configured to receive the reflector 120, and light sources 113 (with reference to FIG. 6).

In the display apparatus 100 according to this embodiment of the present invention, the reflector 120 is improved to have a mold-type structure so as to receive the light guide plate 111 and the optical sheets 112 therein, thereby being capable of simultaneously achieving both alignment and assembly of the light guide plate 111 and the optical sheets 112 with the reflector 120.

The light guide plate 111 can convert light from the light sources 113, formed as at least one point light source or linear light source, into surface light. The light guide plate 111 can have an approximately rectangular shape. One first protrusion 114 or a plurality of first protrusions 114 can be provided on one side surface of the light guide plate 111. Of course, the first protrusions 114 can be provided on another side surface of the light guide plate 111 opposite the one side surface. This embodiment of the present invention exemplarily illustrates that the first protrusions 114 are provided on both side surfaces of the light guide plate 111 opposite each other. Two first protrusions 114 can be provided adjacent to a central area on one side surface of the light guide plate 111, and one first protrusion 114 can be provided adjacent to a central area on the other side surface of the light guide plate 111 (with reference to FIG. 3). These are only examples and other variations are possible.

The optical sheets 112 can be arranged on the upper surface of the light guide plate 111 so as to form a multilayer structure. The optical sheets 112 can include a diffusion sheet 112a, a first prism sheet 112b and a second prism sheet 112c.

The diffusion sheet 112a can contact the upper surface of the light guide plate 111, or be arranged adjacent to the upper surface of the light guide plate 111. The diffusion sheet 112a can uniformize brightness of light emitted from the light guide plate 111 so as to maintain surface light having more uniform brightness. The diffusion sheet 112a can have an approximately rectangular shape.

The first prism sheet 112b can be arranged on the upper surface of the diffusion sheet 112a, and the second prism sheet 112c can be arranged on the upper surface of the first prism sheet 112b. The respective prism sheets 112b and 112c can concentrate light traveling in the lateral direction so as to travel in the forward direction, thereby increasing luminance of the light. Respective prism patterns of the first prism sheet 112b and the second prism sheet 112c can be arranged at a right angle with each other. The first prism sheet 112b and the second prism sheet 112c can have a size and shape corresponding to those of the diffusion sheet 112a.

Second protrusions 115 protruding outwards can be provided one side surface of each of the optical sheets 112. Also, the second protrusions 115 can be provided on the other side surface of each of the optical sheets 112. The second protrusion 115 can be arranged at positions which overlap the first protrusions 114 in the vertical direction.

The guide panel 150 can support the display panel from above, and be connected to the bottom cover 130. Pocket covers 151 can be provided at positions corresponding to the first protrusions 114 or the second protrusions 115 on the side surfaces of the guide panel 150. The pocket covers 151 can be arranged to cover at least the upper portions of the first protrusions 114 and the second protrusions 115 when the guide panel 150 and the bottom cover 130 are coupled. The pocket covers 151 can be configured to cover guide pockets of the reflector 120, which will be described below.

Figure 3:
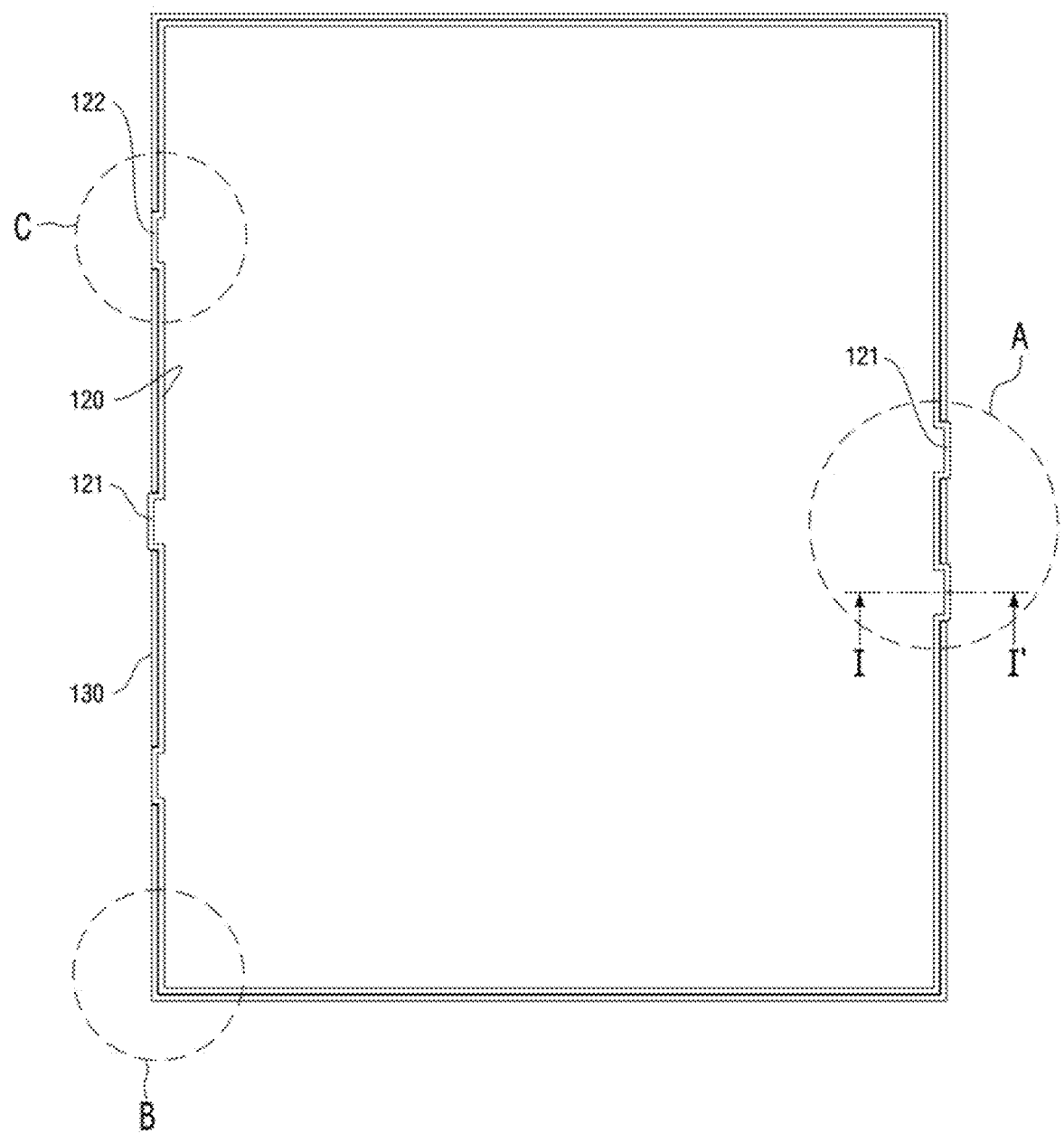
FIG. 3 is a plan view illustrating a reflector shown in FIG. 2.
Figure 4:
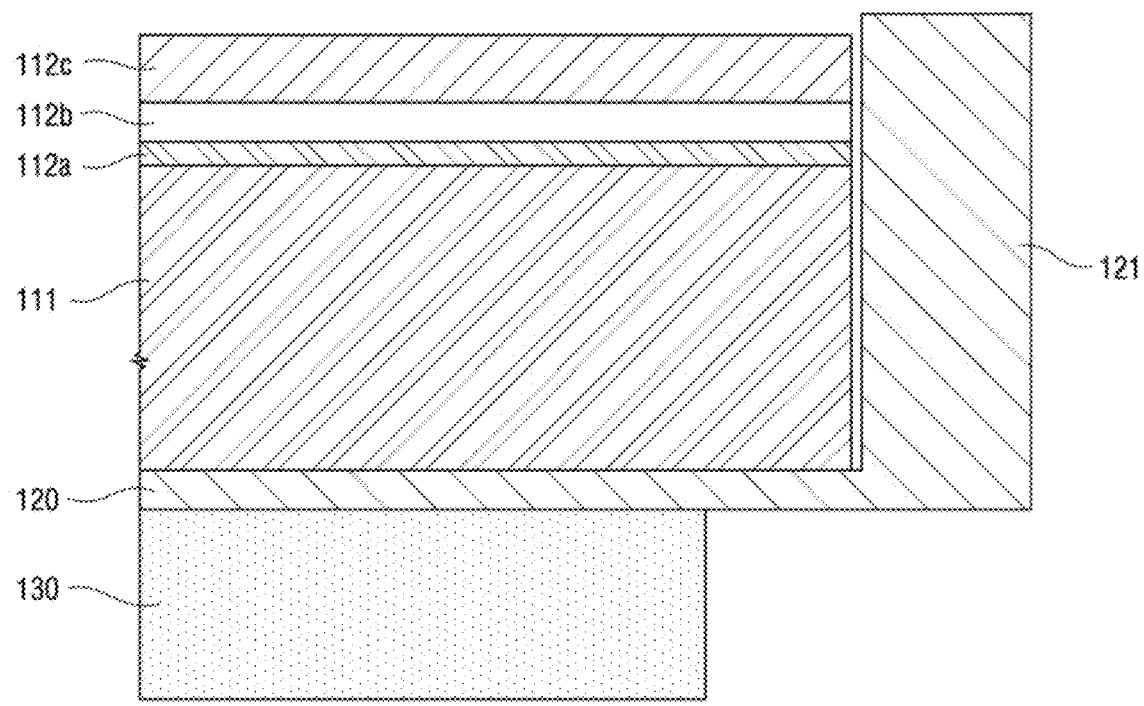
FIG. 4 is a cross-sectional view of the reflector shown in FIG. 3, taken along line I-I'.
Figure 5:
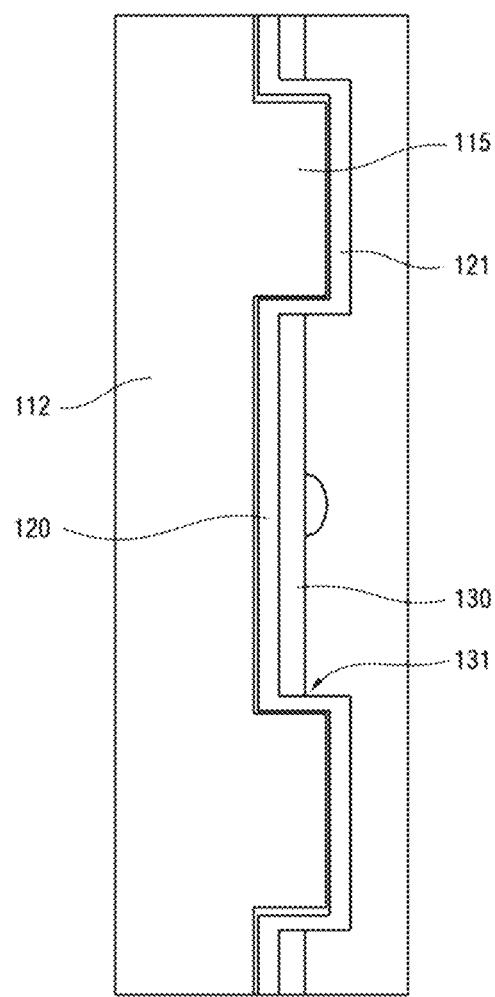
FIG. 5 is a partially enlarged view illustrating region A of the reflector shown in FIG. 3.

FIG. 3 is a plan view illustrating the reflector shown in FIG. 2, FIG. 4 is a cross-sectional view of the reflector shown in FIG. 3, taken along line I-I', and FIG. 5 is a partially enlarged view illustrating region A of the reflector shown in FIG. 3.

Referring to FIGS. 3 to 5, the reflector 120 includes guide pockets 121, which protrude outward, provided on at least one side surface thereof. The reflector 120 can be formed of polycarbonate (PC). Therefore, the reflector 120 has properties, such as impact resistance, thermal resistance, weather resistance, self-extinguishability and transparency, and has impact absorption capability which is about 150 times or more that of tempered glass and thus has excellent flexibility and processability. Of course, the material for the reflector 120 is not limited thereto. The reflector 120 can basically have a box shape, the upper surface of which is open. The first guide pockets 121 can protrude from the side surfaces of the reflector 120. Of course, the first guide pockets 121 can be provided on the other surface of the reflector 120 opposite the one surface of the reflector 120. As the light guide plate 111 or the optical sheets 112 are seated within the reflector 120, the first protrusions 114 and the second protrusions 115 can be inserted into the first guide pockets 121 so as to overlap the first guide pockets 121. Therefore, the first guide pockets 121 can cover the lateral and lower surfaces of the first protrusions 114 and the second protrusions 115. When the light guide plate 111 and the optical sheets 112 are coupled to the inside of the reflector 120, the first protrusions 114 and the second protrusions 115 are coupled to the first guide pockets 121, and alignment of the light guide plate 111 and/or the optical sheets 112 with the reflector 120 can be achieved thereby. Therefore, alignment and coupling of the light guide plate 111 and the optical sheets 112 with the reflector 120 can be simplified compared to a process for aligning and coupling a light guide plate, a reflective sheet, optical sheets and a bottom cover with each other in a conventional assembly process. Alignment of the light guide plate 111 and the optical sheets 112 with the reflector 120 can be carried out simultaneously with such an assembly process, only by coupling the light guide plate 111 and the optical sheets 112 to the inside of the reflector 120.

The reflector 120 can be installed within the bottom cover 130. First pocket grooves 131 can be formed at positions of side surfaces of the bottom cover 130 corresponding to the positions of the first guide pockets 121 by cutting off some regions of the side walls of the bottom cover 130. Therefore, the first guide pockets 121 can be exposed from the side walls of the bottom cover 130.

Figure 7A:
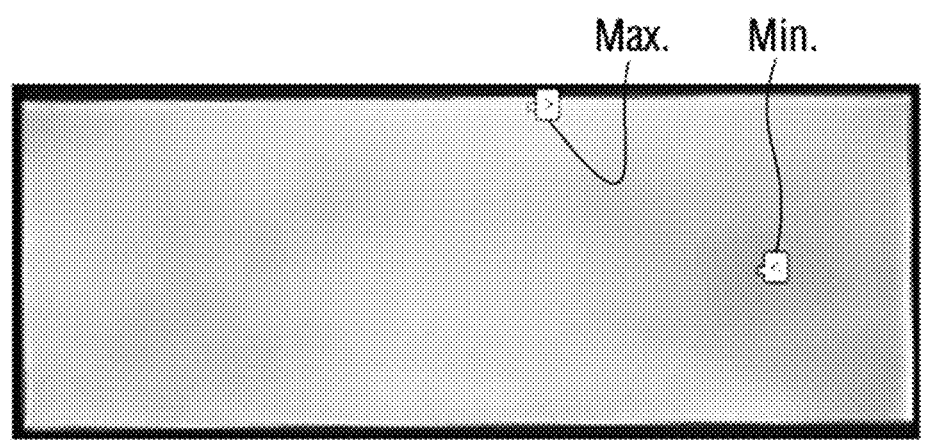
FIGS. 7A and 7B are reference views illustrating measurement of luminance uniformity depending on whether or not stoppers of the light guide plate are present.
Figure 7B:
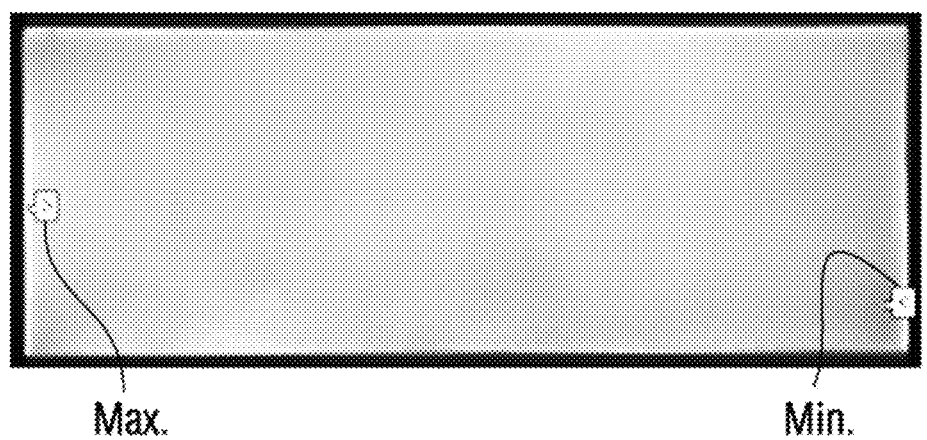
Figure 8:
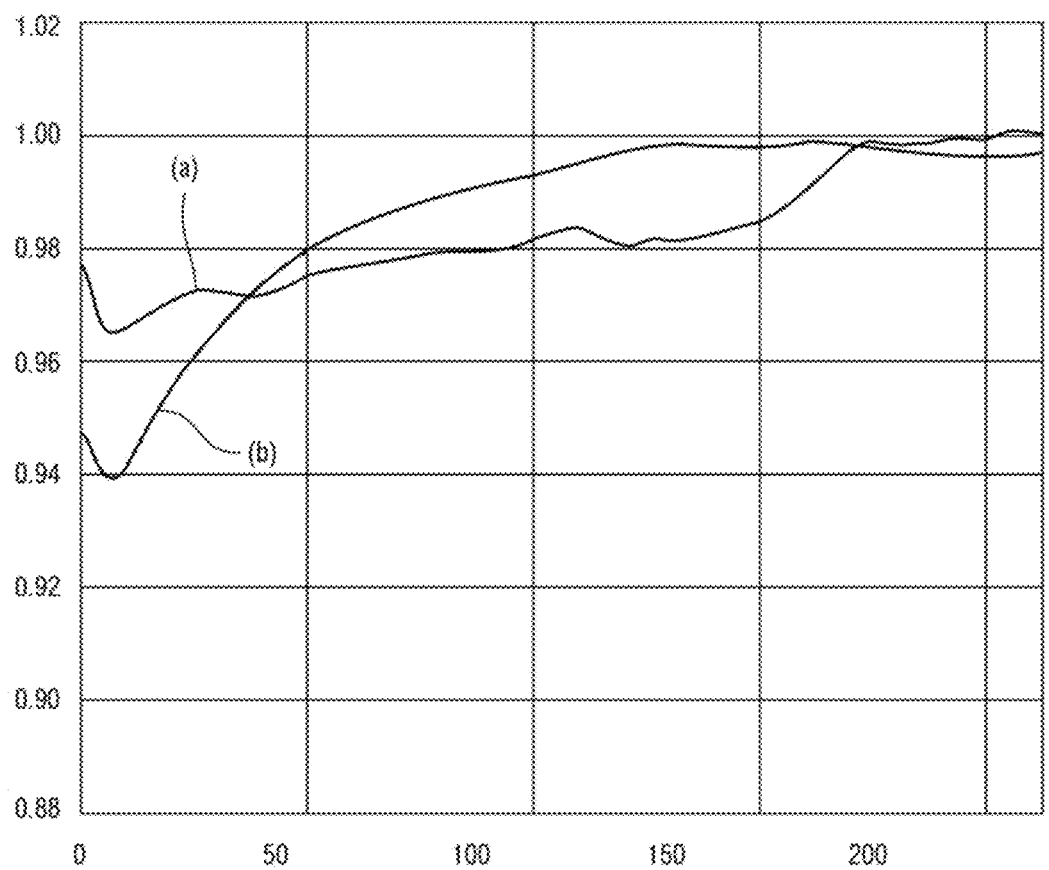
FIG. 8 is a graph representing luminance measured depending on whether or not the stoppers of the light guide plate are present.

FIG. 6 is a partially enlarged view illustrating region B of the reflector shown in FIG. 3, FIGS. 7(a) and 7(b) are reference views illustrating measurement of luminance uniformity depending on whether or not stoppers of the light guide plate are present, and FIG. 8 is a graph representing luminance measured depending on whether or not the stoppers of the light guide plate are present.

Referring to FIGS. 6 to 8, the light sources 113 can be arranged in an edge area s3 to which one side surface and another side surface s2 of the reflector 120 opposite the one side surface are adjacent. Of course, when the backlight unit is an edge-type backlight unit, the light sources 113 can be arranged at edge areas opposite each other, and when the backlight unit is a direct-type backlight unit, the light sources 113 can be arranged on the rear surface of the light guide plate 111. In this embodiment, the backlight unit has an edge-type structure, and the light sources 113 are provided at only one edge area s3.

Conventionally, stoppers are provided at both side ends of the edge area s3 having the light sources 113 arranged therein. On the other hand, in the present invention, the first protrusions 114 are coupled to the first guide pockets 121, and thus stoppers can be omitted. Therefore, the positions of the light sources 113 can be moved closer to both ends of the edge area s3 where the conventional stoppers are removed, thus providing uniform luminance to the edge areas of the light guide plate 111. FIGS. 7A and 7B illustrate consequent effects.

FIG. 7A illustrates a structure according to one embodiment of the present invention, in which stoppers are removed from the light guide plate 111, and FIG. 7B illustrates a conventional structure, in which stoppers are applied to a light guide plate.

TABLE 1

|  | Removal of LGP stoppers (a) | Application of LGP stoppers (b) |
|---|---|---|
| Minimum value | 87.4% | 84.6% |
| Maximum value | 92.9% | 89.3% |
| Average value | 91.1% | 87.5% |

As given in Table 1, the structure according to the present invention, in which the stoppers are omitted from the light guide plate 111, has an average value of 91.1%, and the conventional structure, in which the stoppers are applied to the light guide plate, has an average value of 87.5%. Therefore, it can be confirmed that the average value is increased by about 4% by removing the stoppers from the light guide plate 111. In FIG. 8, (a) indicates a curve representing luminance of the structure according to one embodiment of the present invention, from which the stoppers are removed, and (b) indicates a curve representing luminance of the conventional structure, to which the stoppers are applied.

Referring to FIG. 8, the x-axis indicates the positions of the light sources 113, and the y-axis indicates luminance. It can be confirmed that the curve (a) representing luminance of the structure according to one embodiment of the present invention, from which the stoppers are removed, shows that luminance of a portion of the structure, in which the light sources 113 start to be arranged, is remarkably increased compared to the curve (b) representing luminance of the conventional structure, to which the stoppers are applied.

That is to say, as the stoppers are removed from the light guide plate 111, the light sources 113 are moved closer to both ends of the edge area s3 of the light guide plate 111 and thus become closer to the side surfaces s2 adjacent to both ends of the edge area s3, and thereby, it can be inferred that luminance in both ends of the edge areas of the light guide plate 111 can be increased and luminance uniformity can be increased thereby.

Figure 9:
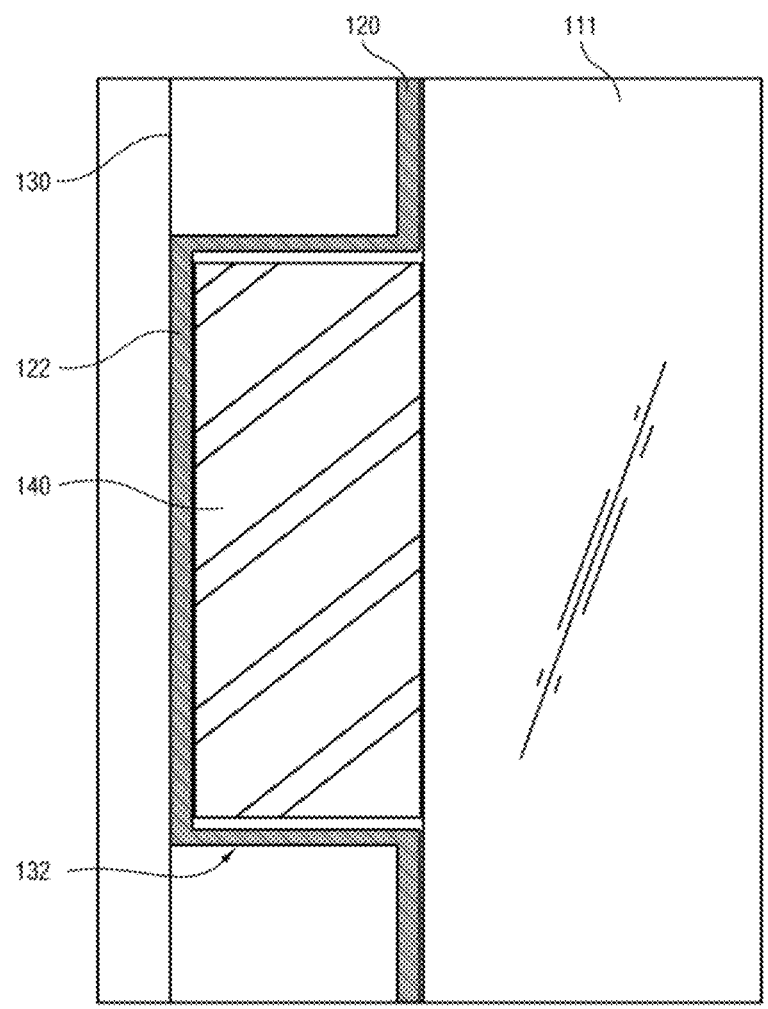
FIG. 9 is a partially enlarged view illustrating region C of the reflector shown in FIG. 3.

FIG. 9 is a partially enlarged view illustrating region C of the reflector shown in FIG. 3.

Referring to FIGS. 3 and 9, second guide pockets 122 can be provided on the other side surface s2 of the reflector 120. Here, the surface of the light guide plate 111 facing the other side surface s2 of the reflector 120 can be formed as a flat surface. Therefore, a vacant space can be formed in the second guide pocket 122 between the reflector 120 and the other side surface of the light guide plate 111, and a rattle pad 140 can be inserted into the vacant space.

The rattle pad 140 can be formed of the same material as a foam pad, or an elastic material. The rattle pad 140 in the second guide pocket 122 presses or supports the other side surface of the light guide plate 111, and can thus prevent movement of the light guide plate 111 and simultaneously prevent movement noise therefrom. Here, the second guide pockets 122 can be formed so as not to be exposed to the outside of the bottom cover 130. Therefore, it is not necessary to secure an additional space for the second guide pockets 122. Further, the other side surface of the light guide plate 111 can be arranged so as to be spaced apart from the other side surface s2 of the reflector 120. The rattle pads 140 support portions of the light guide plate 111 and the other side surface s2 of the reflector 120 which are spaced apart from each other, and can thus supplement the spaced portions of the light guide plate 111 and the other side surface s2 of the reflector 120.

The second guide pockets 122 can be provided in plural on the other side surface s2 of the reflector 120.

The bottom cover 130 can be provided with second pocket grooves 132 configured to receive protruding portions of the second guide pockets 122. Here, the protruding distance of the second guide pockets 122 can correspond to the thickness of the side wall of the bottom cover 130. For example, the second guide pockets 122 can be arranged such that the outer surfaces of the second guide pockets 122 are exposed from the second pocket grooves 132 of the bottom cover 130 but do not protrude to the outside of the side wall of the bottom cover 130. Therefore, even if pocket covers are not separately provided on the guide panel 150, the guide panel 150 can cover the second guide pockets 122 when the guide panel 150 is coupled to the bottom cover 130.

Therefore, in the backlight unit and the display apparatus including the same according to one embodiment of the present invention, the reflector can be modified from a sheet type into a mold type so as to minimize image quality deterioration caused by shrinkage and swelling upon reliability evaluation, the reflector can receive the light guide plate and the optical sheets so as to make it possible to simultaneously perform alignment and assembly of the light guide plate and the optical sheets with the reflector, and an unnecessary support structure can be omitted from the light guide plate so as to provide surface light having high and uniform luminance.

As is apparent from the above description, a backlight unit and a display apparatus including the same according to one or more embodiments of the present invention have the following effects and advantages.

First, a reflector is modified from a sheet type into a mold type, thereby being capable of minimizing image quality deterioration which can be caused by shrinkage and swelling upon reliability evaluation.

Second, the reflector receives a light guide plate and optical sheets, thereby making it possible to simultaneously perform alignment and assembly of the light guide plate and the optical sheets with the reflector.

Third, an unnecessary support structure can be omitted from the light guide plate, thereby being capable of providing surface light having high and uniform luminance.

The features, structures and effects described in the above embodiments of the present invention are included in at least one embodiment of the present invention, but are not limited to the one embodiment. Further, it will be apparent to those skilled in the art that the features, structures and effects described in the at least one embodiment of the present invention can be combined or modified into other embodiments. Therefore, content related to these combinations and modifications should be interpreted as being included in the scope of the invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight unit comprising:
   a light guide plate;
   optical sheets arranged on an upper surface of the light guide plate;
   a reflector configured to accommodate the light guide plate and the optical sheets therein; and
   a bottom cover configured to accommodate the reflector therein,
   wherein the reflector comprises at least one first guide pocket protruding outward from one side surface thereof or two side surfaces thereof opposite each other, and
   wherein the bottom cover comprises at least one first pocket groove formed in one side wall thereof so that the at least one first guide pocket of the reflector is inserted thereinto.

2. The backlight unit according to claim 1, wherein the light guide plate comprises at least one first protrusion configured to protrude so as to be mounted in the at least one first guide pocket of the reflector.

3. The backlight unit according to claim 2, wherein the optical sheets comprise at least one second protrusion configured to protrude so as to be mounted in the at least one first guide pocket of the reflector.

4. The backlight unit according to claim 1, wherein the reflector further comprises at least one second guide pocket protruding from another side surface thereof opposite the one surface of the reflector.

5. The backlight unit according to claim 4, further comprising at least one rattle pad inserted into the at least one second guide pocket so as to contact a side surface of the light guide plate corresponding to the another side surface of the reflector.

6. The backlight unit according to claim 5, wherein the at least one rattle pad elastically presses the light guide plate from an inside of the at least one second guide pocket of the reflector.

7. The backlight unit according to claim 4, wherein the bottom cover comprises at least one second pocket groove formed in another side wall thereof opposite the one side wall of the bottom cover so that the at least one second guide pocket of the reflector is inserted thereinto.

8. The backlight unit according to claim 2, wherein light sources configured to emit light to the light guide plate are arranged on another side surface of the reflector adjacent to the at least one first protrusion of the light guide plate.

9. A display apparatus comprising:
   a guide panel configured to support edge areas of a rear surface of a display panel; and
   a backlight unit including:
      a bottom cover configured to be positioned opposite the guide panel, optical sheets provided between the guide panel and the bottom cover, a light guide plate arranged on a rear surface of a rearmost one of the optical sheets, a reflector configured to accommodate the light guide plate therein, and light sources configured to emit light to the light guide plate, wherein the reflector comprises at least one first guide pocket protruding outward from one side surface thereof or two side surfaces thereof opposite each other, and wherein the bottom cover comprises at least one first pocket groove formed in one side wall thereof so that the at least one first guide pocket of the reflector is inserted thereinto.

10. The display apparatus according to claim 9, wherein the reflector comprises:

at least one second guide pocket protruding from another side surface thereof opposite the one side surface of the reflector.

11. The display apparatus according to claim 10, wherein the guide panel comprises at least one pocket cover configured to cover an upper portion of the at last one first guide pocket of the reflector.

12. A backlight unit comprising:

a light guide plate;

optical sheets arranged on an upper surface of the light guide plate;

a reflector configured to accommodate the light guide plate and the optical sheets therein; and a bottom cover configured to accommodate the reflector therein, wherein the reflector comprises at least one first guide pocket protruding outward from one side surface thereof or two side surfaces thereof opposite each other, and wherein the light guide plate comprises at least one first protrusion configured to protrude so as to be mounted in the at least one first guide pocket of the reflector.

* * * * *